US012097596B2

(12) United States Patent
Silha et al.

(10) Patent No.: US 12,097,596 B2
(45) Date of Patent: Sep. 24, 2024

(54) POWERED RATCHETING TORQUE WRENCH

(71) Applicant: MILWAUKEE ELECTRIC TOOL CORPORATION, Brookfield, WI (US)

(72) Inventors: Wyatt R. Silha, Milwaukee, WI (US); Jacob P. Schneider, Madison, WI (US); John S. Dey, IV, Milwaukee, WI (US); Hans T. Banholzer, Milwaukee, WI (US); Qiang Wei Li, Dongguan (CN); Pu Shao Zhang, Dongguan (CN); Qian Guo Qin, Dongguan (CN)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

(21) Appl. No.: 17/892,490

(22) Filed: Aug. 22, 2022

(65) Prior Publication Data

US 2022/0395967 A1 Dec. 15, 2022

Related U.S. Application Data

(63) Continuation of application No. 16/420,380, filed on May 23, 2019, now Pat. No. 11,453,105, which is a (Continued)

(30) Foreign Application Priority Data

Mar. 12, 2019 (CN) ......................... 201920314117.5

(51) Int. Cl.

*B25B 23/147* (2006.01)
*B25B 13/46* (2006.01)
*B25B 21/00* (2006.01)

(52) U.S. Cl.

CPC .......... *B25B 21/004* (2013.01); *B25B 13/465* (2013.01); *B25B 23/147* (2013.01)

(58) Field of Classification Search

CPC ....... B25B 13/10; B25B 13/46; B25B 13/465; B25B 13/48; B25B 13/481;

(Continued)

(56) References Cited

U.S. PATENT DOCUMENTS 3,666,021 A 5/1972 Whitehouse
3,920,082 A * 11/1975 Dudek ................ B25B 23/1456 91/59

(Continued)

FOREIGN PATENT DOCUMENTS

CN 201239931 5/2009
CN 203031525 7/2013

(Continued)

OTHER PUBLICATIONS

European Patent Office Action for Application No. 17851408.9 dated Sep. 28, 2022 (7 pages).

(Continued)

*Primary Examiner* — Robert J Scruggs
(74) *Attorney, Agent, or Firm* — Michael Best & Friedrich LLP

(57) ABSTRACT

A power tool comprises a housing defining a grip portion, a motor having a motor drive shaft, a drive assembly including a crankshaft configured to receive torque from the motor drive shaft, an output assembly having an output member configured to receive torque from the crankshaft, a bearing rotatably supporting the crankshaft, a retainer configured to prevent translation of the bearing along the crankshaft past the retainer, and a transducer assembly disposed between the grip portion and the output member to measure the amount of torque applied through the output member.

7 Claims, 15 Drawing Sheets

Related U.S. Application Data continuation-in-part of application No. 15/703,766, filed on Sep. 13, 2017, now Pat. No. 10,625,405, which is a continuation-in-part of application No. PCT/US2017/051252, filed on Sep. 13, 2017.

(60) Provisional application No. 62/393,862, filed on Sep. 13, 2016.

(58) Field of Classification Search
CPC . B25B 13/5091; B25B 21/004; B25B 21/005; B25B 21/06; B25B 23/1425; B25B 23/1456; B25B 23/147; B25B 23/16; B25B 17/00; E21B 19/16; B25F 5/001; B25F 5/02
See application file for complete search history.

(56) References Cited

U.S. PATENT DOCUMENTS

| | | | |
|---|---|---|---|
| 3,995,477 | A | 12/1976 | Almond |
| 4,125,016 | A | 11/1978 | Lehoczky et al. |
| 4,281,538 | A | 8/1981 | Dudek |
| 4,558,601 | A | 12/1985 | Stasiek et al. |
| 4,669,319 | A | 6/1987 | Heyraud |
| 4,685,050 | A | 8/1987 | Polzer et al. |
| 4,787,136 | A | 11/1988 | Majic |
| 4,941,362 | A | 7/1990 | Tambini |
| 4,958,541 | A | 9/1990 | Annis et al. |
| 4,969,105 | A | 11/1990 | Gaenssle |
| 4,976,133 | A | 12/1990 | Pohl |
| 4,982,612 | A | 1/1991 | Rittmann |
| 5,105,130 | A | 4/1992 | Barker et al. |
| 5,142,952 | A * | 9/1992 | Putney .................. B25B 13/465 81/57.39 |
| 5,229,931 | A | 7/1993 | Takeshima et al. |
| 5,303,601 | A | 4/1994 | Schönberger et al. |
| 5,544,534 | A | 8/1996 | Fujitaka |
| 5,637,968 | A | 6/1997 | Kainec et al. |
| 6,070,506 | A | 6/2000 | Becker |
| 6,093,128 | A | 7/2000 | Seith |
| 6,526,853 | B2 | 3/2003 | Jenkins |
| 6,968,759 | B2 | 11/2005 | Becker et al. |
| 6,981,436 | B2 | 1/2006 | Becker et al. |
| 7,080,578 | B2 * | 7/2006 | Izumisawa .............. B25B 21/02 81/57.39 |
| 7,090,030 | B2 | 8/2006 | Miller |
| 7,096,569 | B1 | 8/2006 | Barr et al. |
| 7,249,526 | B2 | 7/2007 | Hsieh |
| 7,320,254 | B1 | 1/2008 | Martin |
| 7,400,106 | B2 | 7/2008 | DeCicco et al. |
| 7,562,589 | B2 | 7/2009 | Anjanappa et al. |
| 7,578,357 | B2 | 8/2009 | Schell |
| 7,591,195 | B2 | 9/2009 | Puzio |
| 7,823,486 | B2 | 11/2010 | Wise |
| 8,215,187 | B2 | 7/2012 | Chen |
| 8,316,741 | B2 | 11/2012 | Wallgren |
| 8,443,703 | B2 | 5/2013 | Chen |
| 8,674,640 | B2 | 3/2014 | Suda et al. |
| 8,714,057 | B2 | 5/2014 | Anjanappa et al. |
| 8,763,722 | B2 | 7/2014 | Braun et al. |
| 8,844,381 | B2 | 9/2014 | Gharib |
| 8,869,630 | B2 | 10/2014 | Watson et al. |
| 9,085,072 | B2 | 7/2015 | Anjanappa et al. |
| 9,120,213 | B2 | 9/2015 | Elger |
| 9,156,148 | B2 | 10/2015 | King et al. |
| 9,308,633 | B2 | 4/2016 | Gharib |
| 9,327,390 | B2 | 5/2016 | Hsieh |
| 9,561,583 | B2 | 2/2017 | Hsieh |
| 9,649,753 | B2 | 5/2017 | Hsieh |
| 9,669,527 | B2 | 6/2017 | Ho et al. |
| 2002/0069730 | A1 | 6/2002 | Lehnert et al. |
| 2005/0090216 | A1 | 4/2005 | Hsu et al. |
| 2006/0027058 | A1 | 2/2006 | Hsien |
| 2006/0283265 | A1 | 12/2006 | Izumisawa |
| 2007/0169591 | A1 * | 7/2007 | Schincariol ......... B25B 23/0035 81/177.85 |
| 2008/0011563 | A1 | 1/2008 | Yamamoto |
| 2008/0098863 | A1 | 5/2008 | Kaneyama et al. |
| 2008/0115589 | A1 | 5/2008 | DeRose et al. |
| 2008/0127711 | A1 | 6/2008 | Farag |
| 2009/0138116 | A1 | 5/2009 | Austin et al. |
| 2010/0107824 | A1 | 5/2010 | Hanspers et al. |
| 2010/0206141 | A1 | 8/2010 | Nakata et al. |
| 2011/0023280 | A1 | 2/2011 | Renke |
| 2011/0093110 | A1 | 4/2011 | Stencel et al. |
| 2011/0107882 | A1 | 5/2011 | Chen |
| 2011/0303054 | A1 | 12/2011 | Cattaneo |
| 2012/0006161 | A1 | 1/2012 | Chen |
| 2012/0119919 | A1 | 5/2012 | Chen |
| 2012/0132043 | A1 | 5/2012 | Chen et al. |
| 2012/0186400 | A1 * | 7/2012 | Elger .................... B25B 13/465 81/54 |
| 2012/0255404 | A1 | 10/2012 | Chang et al. |
| 2012/0297939 | A1 | 11/2012 | Spata |
| 2012/0312132 | A1 | 12/2012 | Li et al. |
| 2013/0137468 | A1 | 5/2013 | Kahle et al. |
| 2013/0199307 | A1 | 8/2013 | Provost et al. |
| 2013/0203016 | A1 | 8/2013 | Takahashi et al. |
| 2014/0009305 | A1 | 1/2014 | Schultz et al. |
| 2014/0034194 | A1 | 2/2014 | Imataka et al. |
| 2014/0144281 | A1 | 5/2014 | Kosaka et al. |
| 2014/0331828 | A1 | 11/2014 | King et al. |
| 2014/0331831 | A1 | 11/2014 | King et al. |
| 2014/0338419 | A1 | 11/2014 | Hsieh |
| 2015/0007699 | A1 | 1/2015 | Lee et al. |
| 2015/0013475 | A1 | 1/2015 | Gharib |
| 2015/0059531 | A1 | 3/2015 | Ely |
| 2015/0190911 | A1 | 7/2015 | Yokoyama et al. |
| 2015/0328756 | A1 | 11/2015 | Ho et al. |
| 2015/0336248 | A1 | 11/2015 | Goe |
| 2016/0089734 | A1 | 3/2016 | Eshleman et al. |
| 2016/0129569 | A1 | 5/2016 | Lehnert et al. |
| 2016/0161354 | A1 | 6/2016 | Jiang |
| 2016/0167208 | A1 | 6/2016 | Li |
| 2016/0176029 | A1 | 6/2016 | Hsieh |
| 2016/0288304 | A1 | 10/2016 | Shaio |
| 2016/0313198 | A1 | 10/2016 | Elsmark et al. |
| 2016/0325413 | A1 | 11/2016 | Hsieh |
| 2016/0334288 | A1 | 11/2016 | Berme et al. |
| 2017/0095912 | A1 | 4/2017 | Hsieh |
| 2018/0071901 | A1 * | 3/2018 | Silha ..................... B25B 21/004 |
| 2018/0096530 | A1 | 4/2018 | Greenhalgh et al. |

FOREIGN PATENT DOCUMENTS

| | | | |
|---|---|---|---|
| CN | 104552120 | | 4/2015 |
| CN | 205254877 | | 5/2016 |
| CN | 205290790 | | 6/2016 |
| CN | 105881417 | | 8/2016 |
| CN | 205630452 | | 10/2016 |
| CN | 205630453 | | 10/2016 |
| CN | 205835157 | | 12/2016 |
| EP | 1733845 | A2 | 12/2006 |
| EP | 2749376 | A2 | 7/2014 |
| EP | 2896484 | | 7/2015 |
| JP | 2014166662 | A | 9/2014 |
| WO | 9313399 | | 7/1993 |
| WO | 9838013 | | 9/1998 |
| WO | 2014034194 | | 3/2014 |
| WO | 2015110245 | A1 | 7/2015 |
| WO | 2016072045 | A1 | 5/2016 |

OTHER PUBLICATIONS

Chinese Patent Office Action for Application No. 201780056042.9 dated Apr. 27, 2020 (14 pages including statement of relevance).
Chinese Patent Office Action for Application No. 201780056042.9 dated Jan. 7, 2022 (5 pages including statement of relevance).
European Patent Office Extended Search Report for Application No. 17851408.9 dated Jul. 10, 2020 (8 pages).
European Patent Office Action for Application No. 17851408.9 dated Mar. 4, 2022 (6 pages).

(56) References Cited

OTHER PUBLICATIONS

International Search Report and Written Opinion for Application No. PCT/US2017/051252 dated Dec. 22, 2012, 24 pages.
European Patent Office Action for Application No. 17851408.9 dated Mar. 27, 2023 (6 pages).
European Patent Office Action for Application No. 17851408.9 dated Nov. 23, 2023 (5 pages).

* cited by examiner

POWERED RATCHETING TORQUE WRENCH

CROSS-REFERENCE TO RELATED APPLICATIONS

This application is a continuation of U.S. patent application Ser. No. 16/420,380 filed on May 23, 2019, now U.S. Pat. No. 11,453,105, which is a continuation-in-part of U.S. patent application Ser. No. 15/703,766 filed on Sep. 13, 2017, now U.S. Pat. No. 10,625,405, which is a continuation-in-part of International Application No. PCT/US2017/051252 filed on Sep. 13, 2017, which claims priority to U.S. Provisional Patent Application No. 62/393,862 filed on Sep. 13, 2016, the entire contents of all of which are incorporated herein by reference. Parent U.S. patent application Ser. No. 16/420,380 also claims priority under 35 U.S.C. § 119(a) to Chinese Utility Model Application No. 201920314117.5 filed on Mar. 12, 2019.

FIELD OF THE INVENTION

The present invention relates to a power tool, and more particularly to a powered ratcheting torque wrench.

BACKGROUND OF THE INVENTION

Powered ratcheting wrenches typically include a motor, a drive assembly driven by the motor, and a rotating output for applying torque to a fastener. The motor may be powered by electricity (e.g., a DC or AC source) or pressurized air.

SUMMARY OF THE INVENTION

The present invention provides, in one aspect, a power tool comprising a housing defining a grip portion, a motor having a motor drive shaft, a drive assembly including a crankshaft configured to receive torque from the motor drive shaft, an output assembly having an output member configured to receive torque from the crankshaft, a bearing rotatably supporting the crankshaft, a retainer configured to prevent translation of the bearing along the crankshaft past the retainer, and a transducer assembly disposed between the grip portion and the output member to measure the amount of torque applied through the output member.

The present invention provides, in another aspect, a power tool comprising a housing defining a grip portion, a motor having a motor drive shaft, a drive assembly coupled to the motor drive shaft and driven by the motor, and an output assembly coupled to the drive assembly and having an output member that receives torque from the drive assembly, causing the output member to rotate about an output axis. The power tool further comprises a transducer assembly including a frame disposed between the grip portion and the output member. The transducer assembly is configured to measure the amount of torque applied through the output member. The power tool further comprises a head in which the output member is arranged, a pin extending through the frame and the head to retain the head to the frame, and a retaining ring arranged around the frame and the pin for exerting a radially inward biasing force against the pin.

The present invention provides, in yet another aspect, a power tool comprising a housing, a motor at least partially supported by the housing, a drive assembly coupled to the motor drive shaft and driven by the motor, a gear case at least partially supporting the drive assembly, and an output assembly coupled to the drive assembly and having an output member that receives torque from the drive assembly, causing the output member to rotate about an axis. The power tool further comprises a frame coupled to the gear case by a fastener, a torque sensor coupled to the frame for determining an output torque of the output member, an electronic processor configured to receive input from the torque sensor, a wire electrically connecting the torque sensor to the processor, the wire at least partially extending along the gear case, and a barrier on the gear case. The barrier prevents the wire from contacting the fastener.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
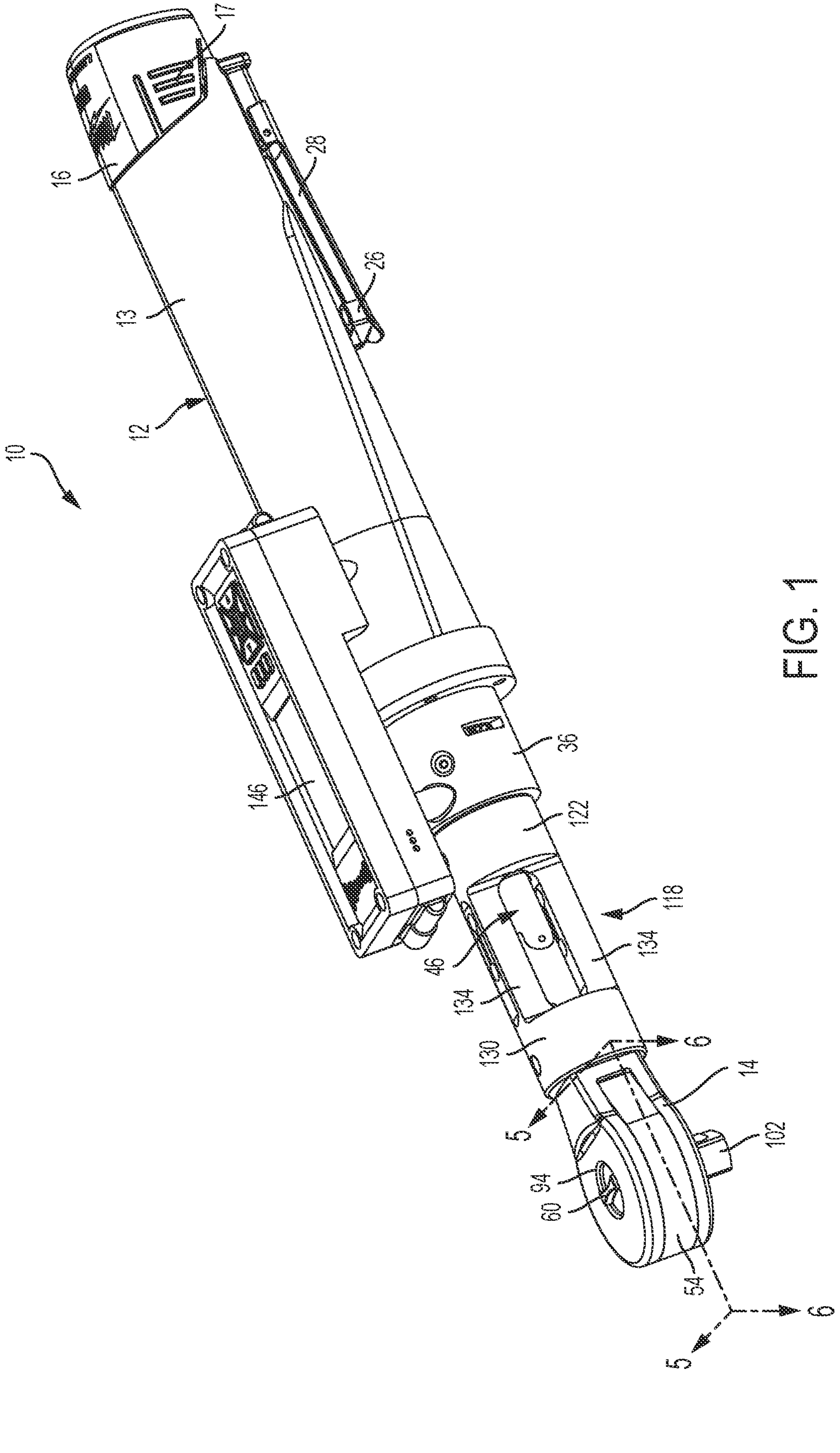
FIG. 1 is a perspective side view of a powered ratcheting torque wrench in accordance with an embodiment of the invention.

FIG. 1 illustrates a battery-powered hand-held ratcheting torque wrench 10. The wrench 10 includes a main housing 12, which has a grip portion 13 graspable by an operator to maneuver the wrench 10, and a battery pack 16 attached to the main housing 12. The battery pack 16 is a removable and rechargeable 12-volt battery pack and includes three (3) Lithium-ion battery cells. In other constructions, the battery pack may include fewer or more battery cells such that the battery pack is a 14.4-volt battery pack, an 18-volt battery pack, or the like. Additionally or alternatively, the battery cells may have chemistries other than Lithium-ion such as, for example, Nickel Cadmium, Nickel Metal-Hydride, or the like.

The battery pack 16 is inserted into a cavity in the main housing 12 in the axial direction of axis A (FIG. 5) and snaps into connection with the main housing 12 adjacent the grip portion 13. The battery pack 16 includes a latch 17 (FIG. 1), which can be depressed to release the battery pack 16 from the wrench 10. In other constructions, the wrench 10 includes a cord and is powered by a remote source of power, such as an AC utility source connected to the cord. In another construction, the wrench 10 may be a pneumatic tool powered by pressurized air flow through a rotary air vane motor, not shown. In this construction, instead of the battery pack 16 and electric motor 18, the wrench 10 includes a rotary air vane motor (not shown) and a connector (not shown) for receiving pressurized air. In other constructions, other power sources may be employed.

Figure 2:
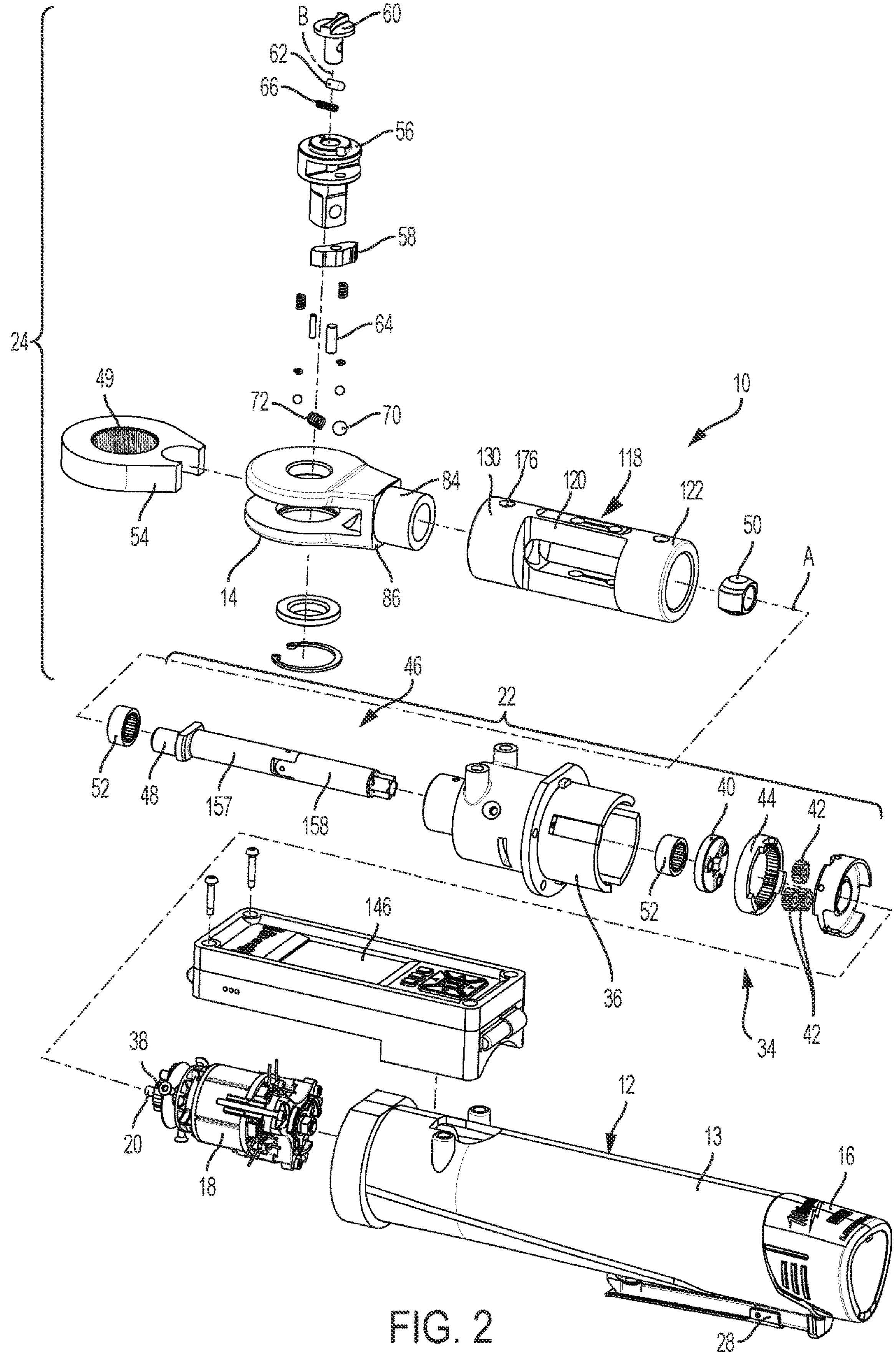
FIG. 2 is an exploded view of the powered ratcheting torque wrench of FIG. 1.

With reference to FIG. 2, the wrench 10 includes a motor 18, a motor drive shaft 20 extending from the motor 18 and centered about the axis A, and a drive assembly 22 coupled to the drive shaft 20 for driving an output assembly 24. The output assembly 24 defines a central axis B substantially perpendicular to axis A. In other embodiments of the torque wrench 10, the output assembly 24 may alternatively be adjustable (e.g., pivotable) relative to the main housing 12 such that the axis B may be perpendicular, obliquely angled, or parallel to the axis A. As illustrated in FIGS. 1 and 2, the wrench 10 also includes an actuator, such as a paddle 28, for actuating an electrical switch 26 to electrically connect the motor 18 to the battery pack 16.

With reference to FIGS. 2-5, the drive assembly 22 includes a planetary geartrain 34 positioned between the motor 18 and the output assembly 24, and located within a gear housing 36. The planetary geartrain 34 includes a sun gear 38 coupled for co-rotation with the motor drive shaft 20, a planet carrier 40, three planet gears 42 rotatably supported upon the carrier 40, and a ring gear 44 fixed within the gear housing 36. Accordingly, torque received from the motor 18 is increased by the planetary geartrain 34, which also provides a reduced rotational output speed compared to the rotational speed of the motor drive shaft 20.

Figure 5:
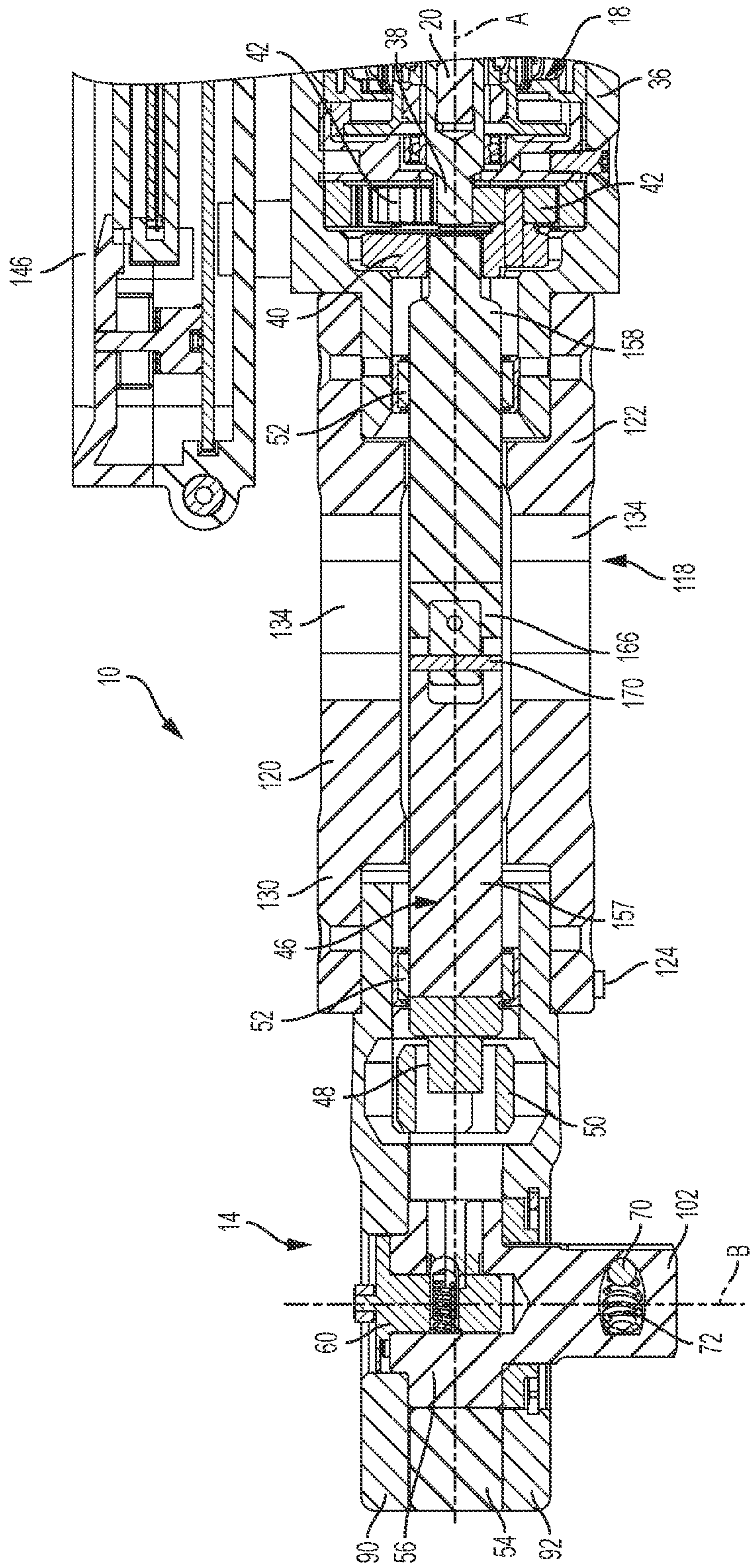
FIG. 5 is a cross-sectional view of a portion of the powered ratcheting torque wrench taken along line 5-5 in FIG. 1.
Figure 6:
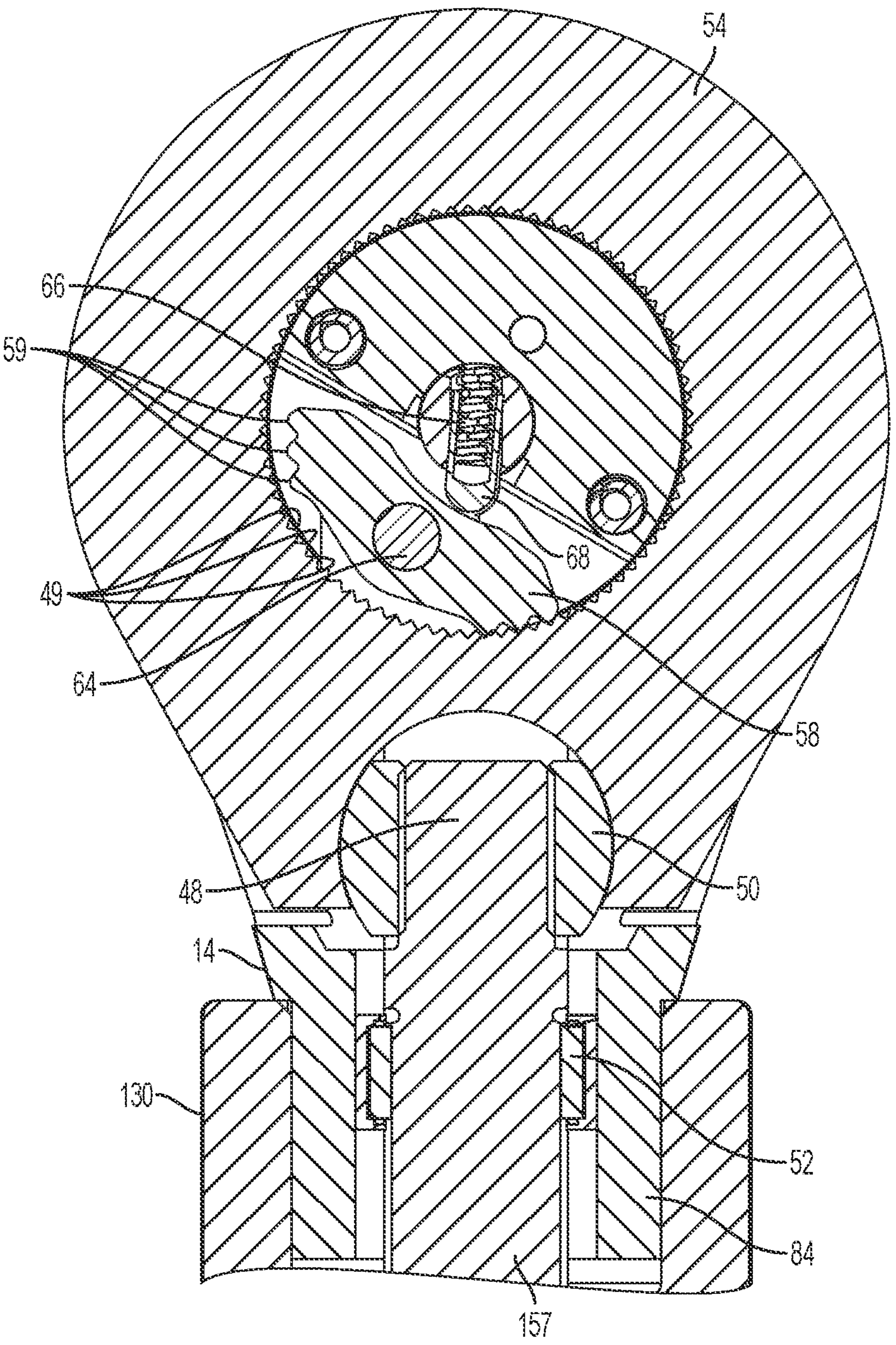
FIG. 6 is a cross-sectional view of a portion of an output assembly of the powered ratcheting torque wrench taken along line 6-6 in FIG. 1.

The drive assembly 22 also includes a multi-piece crankshaft 46 having an eccentric member 48, which is described in further detail below, a drive bushing 50 on the eccentric member 48, and at least two needle bearings 52 supporting the crankshaft 46 for rotation in the gear housing 36 and a head 14, respectively, which is coupled to the gear housing 36. With reference to FIGS. 2 and 5, the output assembly 24 includes a yoke 54 and an anvil 56 rotatably supporting the yoke 54 within the head 14. The anvil 56 includes an output member 102 (FIG. 1), such as a square head for receiving sockets. The output assembly 24 also includes a pawl 58 pivotably coupled to the yoke 54 by a pin 64 and a shift knob 60. The yoke 54, anvil 56, and shift knob 60 are centered along the axis B. As shown in FIG. 6, the output assembly 24 also includes a spring 66 and spring cap 68 supported for co-rotation with the shift knob 60. To adjust the direction of rotation where torque is transferred though the output assembly 24, the shift knob 60 is rotated between two positions, causing the pawl 58 to pivot about the pin 64 (through sliding contact with the spring cap 68) between a first position where torque is transferred to the anvil 56 (by the yoke 54) in a clockwise direction of rotation, and a second position where torque is transferred to the anvil 56 in a counter-clockwise direction of rotation. A combination of at least the yoke 54 and anvil 56 may comprise a ratchet mechanism. The output assembly 24 further includes a detent (e.g., a ball 70) and spring 72 biasing the ball 70 outward for retaining sockets on the output member 102, as shown in FIG. 5.

Figure 3:
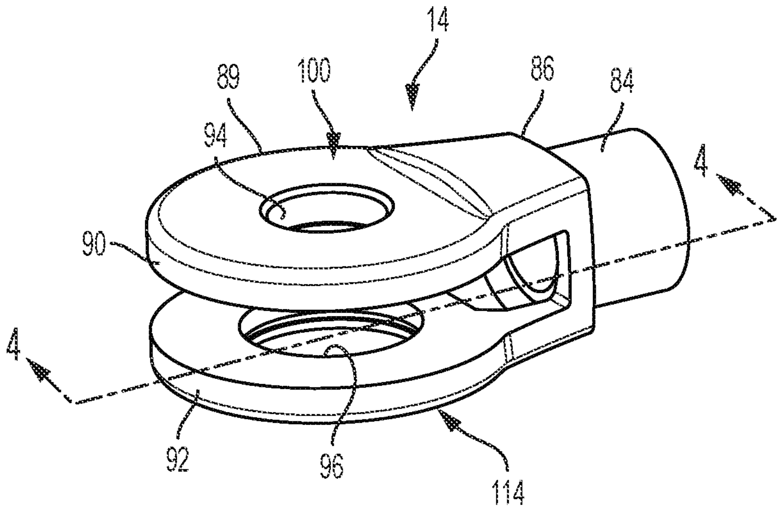
FIG. 3 is a perspective view of a head of the powered ratcheting torque wrench of FIG. 1.
Figure 4:
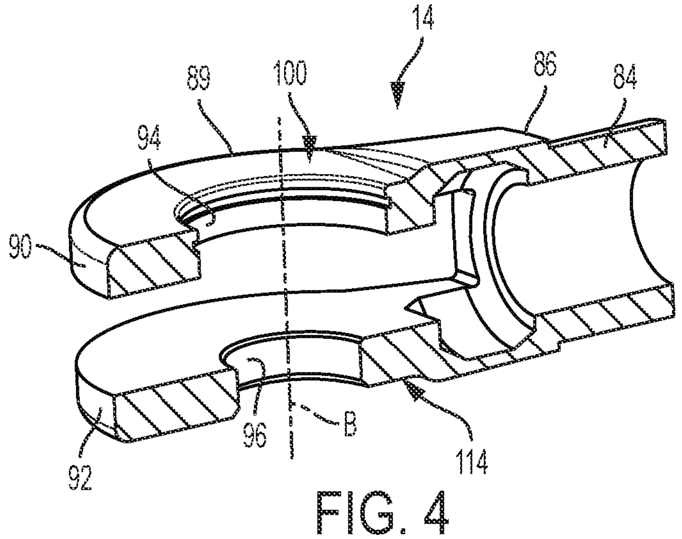
FIG. 4 is a perspective cross-sectional view of the head taken along line 4-4 in FIG. 4.

With reference to FIGS. 3 and 4, the head 14 is formed from steel as one piece and includes a cylindrical portion 84, an adjacent shoulder portion 86, and spaced first and second ears 90, 92 between which the yoke 54 is received. The first ear 90 includes a first aperture 94 and the second ear 92 includes a second aperture 96. The first and second apertures 94, 96 are centered about the axis B. The yoke 54 is received between the first and second ears 90, 92 in a direction perpendicular to axis B. The anvil 56 is received in the first and second apertures 94, 96 and the shift knob 60 is received in the first aperture 94. The first ear 90 includes an outer surface 100 facing away from the second ear 92. The shift knob 60 is fully recessed within the first ear 90 such that the shift knob 60 does not cross a plane defined by the outer surface 100 and is positioned entirely on a side of the outer surface 100 on which the output member 102 is located, as can be seen by the cross section views of FIG. 6. The outer surface 100 is opposite and facing away from the output member 102.

As illustrated in FIG. 6, the output assembly 24 of the wrench 10 includes a single-pawl ratchet design. The pawl 58 is disposed between the first and second ears 90, 92. The yoke 54 is oscillated between a first direction and a second direction about axis B by the eccentric member 48. An inner diameter of the yoke 54 defined by an aperture includes teeth 49 (FIGS. 2 and 6) that mate with angled teeth 59 of the pawl 58 when the yoke 54 moves in the first direction. The yoke teeth 49 slide with respect to the angled teeth 59 of the pawl 58 when the pawl 58 moves in the second direction opposite the first direction such that only one direction of motion is transferred from the yoke 54 to the output member 102. The shift knob 60 cooperates with the spring 66 and the spring cap 68 to orient the pawl 58 with respect to the pin 64 such that the opposite direction of motion is transferred from the yoke 54 to the output member 102 when the shift knob 60 is rotated to a reverse position. In other constructions of the wrench 10, the output assembly 24 may alternatively include a dual-pawl design.

Figure 7:
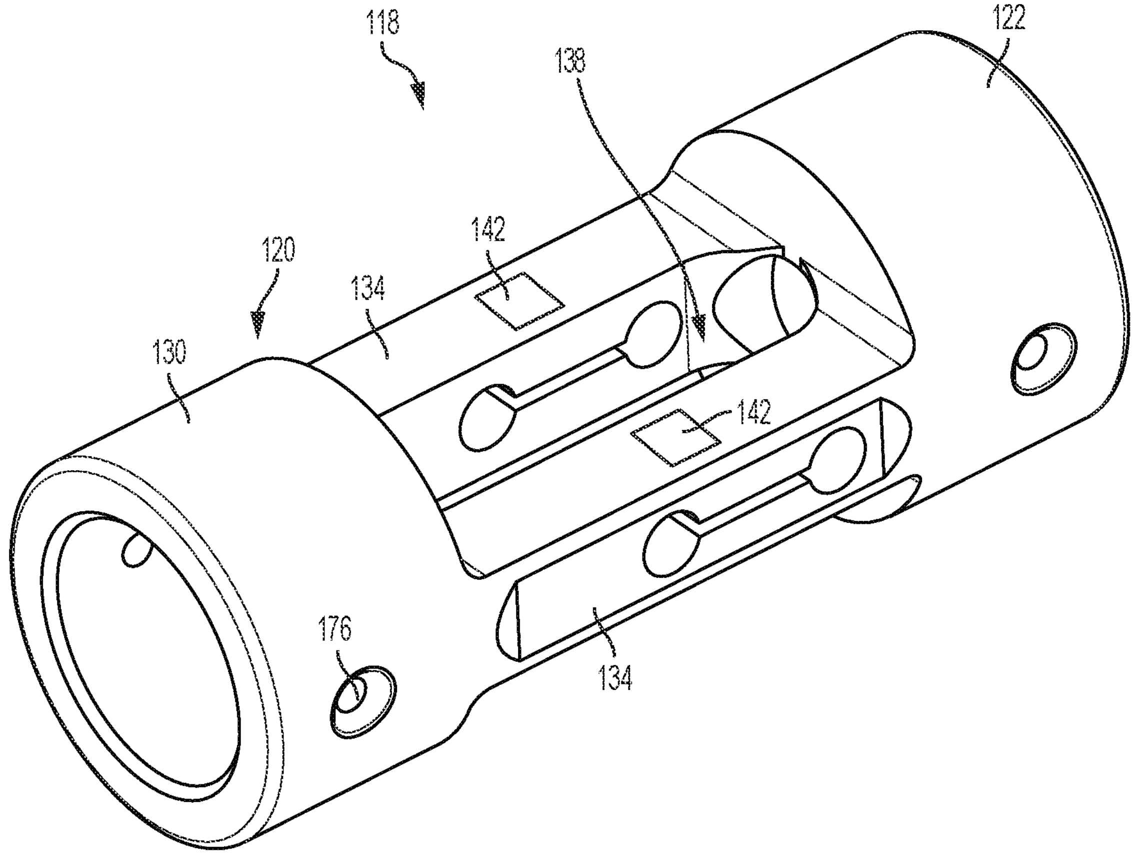
FIG. 7 is a perspective view of a transducer assembly of the powered ratcheting torque wrench of FIG. 1.

With reference to FIG. 7, the wrench 10 further includes a transducer assembly 118 positioned inline and coaxial with the axis A, the motor 18, and the head 14. As explained in further detail below, the transducer assembly 118 detects the torque output by the output member 102 when the wrench 10 is manually rotated about axis B (with the motor 18 deactivated), and indicates to a user (via a display device) when the torque output reaches a pre-defined torque value or torque threshold. For example, the wrench 10 may include a light emitting diode (LED) 124 (FIG. 5) for illuminating a workpiece during use of the wrench 10. But, in response to a pre-defined torque value or torque threshold being reached when the wrench 10 is manually rotated about axis B, the LED 124 may flash to signal the user that the pre-defined torque value is reached.

Figure 9:
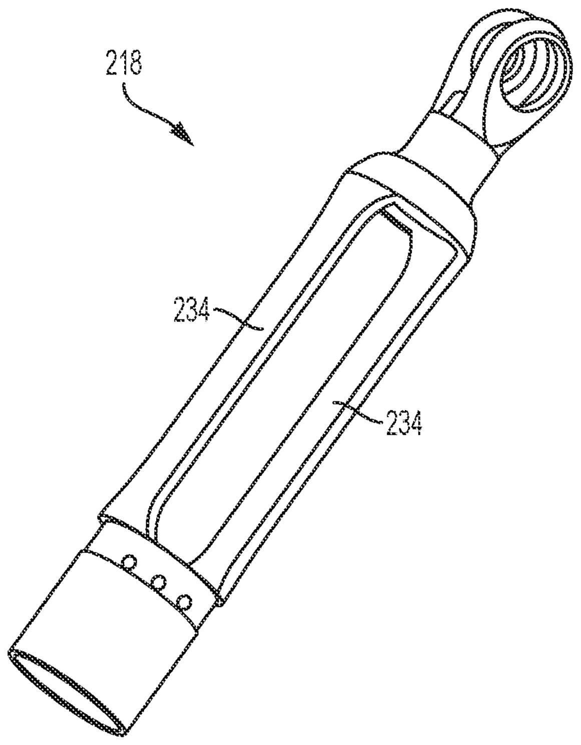
FIG. 9 is a perspective view of a transducer assembly used in a powered ratcheting torque wrench in accordance with another embodiment of the invention.

With reference to FIGS. 5 and 7, the transducer assembly 118 is positioned between and interconnects the head 14 and the gear housing 36. The transducer assembly 118 includes a frame 120 defining a first mount 122 that receives a portion of the gear housing 36 and that is affixed thereto (e.g., by fastening), which in turn is attached to (or alternatively integral with) the housing 12. The frame 120 also includes a second mount 130 that receives the cylindrical portion 84 of the head 14 and that is affixed thereto (e.g., by fastening). The frame 120 further includes two beams 134 extending between the first and second mounts 122, 130. In other embodiments as illustrated in FIG. 9, a transducer assembly 218, which is otherwise similar to transducer assembly 118, may include a frame that is integrally formed with the head 14 such that the frame of the transducer assembly 218 and the head 14 are a single monolithic component.

Figure 10:
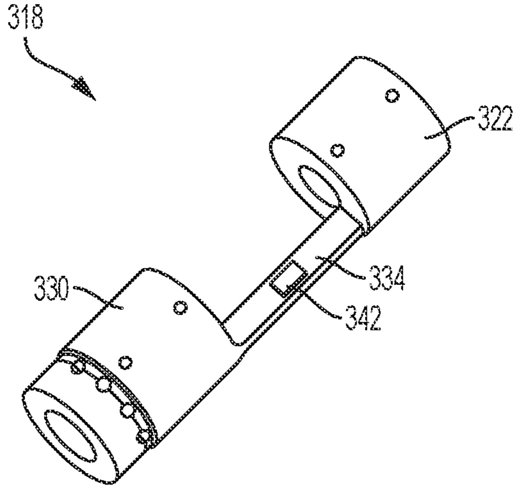
FIG. 10 is a perspective view of a transducer assembly used in a powered ratcheting torque wrench in accordance with yet another embodiment of the invention.

With reference to FIGS. 5 and 7, the beams 134 are parallel and offset from the axis A such that an air gap 138 exists between the beams 134. Also, the transducer assembly 118 includes one or more resistance sensors (e.g., strain gauges 142) coupled to each of the beams 134 for detecting the strain on each of the beams 134 in response to a bending force or moment applied to the beams 134. The strain gauges 142 are electrically connected to a high-level or master controller of the wrench 10 for transmitting respective voltage signals generated by the strain gauges 142 proportional to the magnitude of strain experienced by the respective beams 134, which is indicative of the torque applied to a workpiece (e.g., a fastener) by the output member 102 when the wrench 10 is manually rotated about axis B (with the motor 18 deactivated). Specifically, in response to strain experienced by the respective beams 134, the resistance of the strain gauges 142 is varied and converted to a voltage signal that is sent to the high-level or master controller. In addition, the strain gauges 142 are capable of measuring torque output by the output member 102 while the motor 18 is activated, with the housing 12 being held stationary by the user, as a result of a bending moment applied to the beams 134 during a tightening operation. In this manner, the master controller of the wrench 10 can use the output of the strain gauges 142 to deactivate the motor 18 in response to a predetermined or user-specified torque value being reached. Although the transducer assembly 118 includes two beams 134, in other embodiments, the transducer assembly 118 may alternatively be formed with fewer or greater than two beams 134 and a corresponding number of strain gauges 142. For example and with reference to FIG. 10, transducer assembly 318 is formed with a single beam 334 and a single strain gauge 342 extending between the first and second mounts 322, 330.

Figure 11:
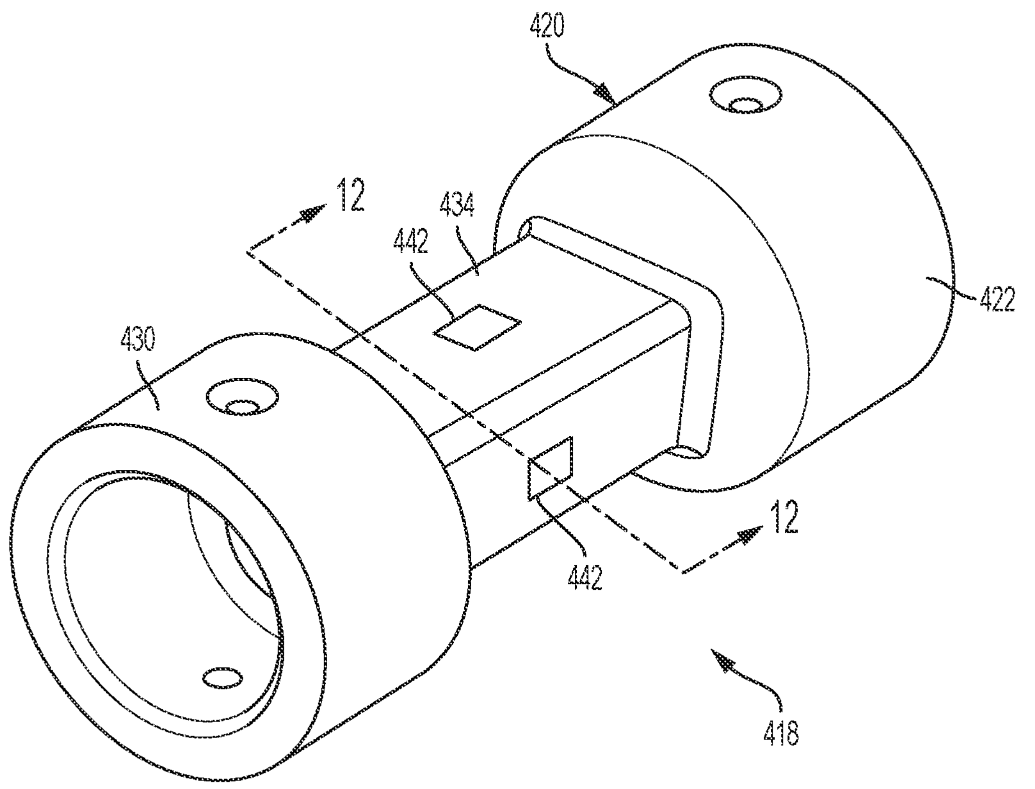
FIG. 11 is a perspective view of a transducer assembly used in a powered ratcheting torque wrench in accordance with yet another embodiment of the invention.
Figure 12:
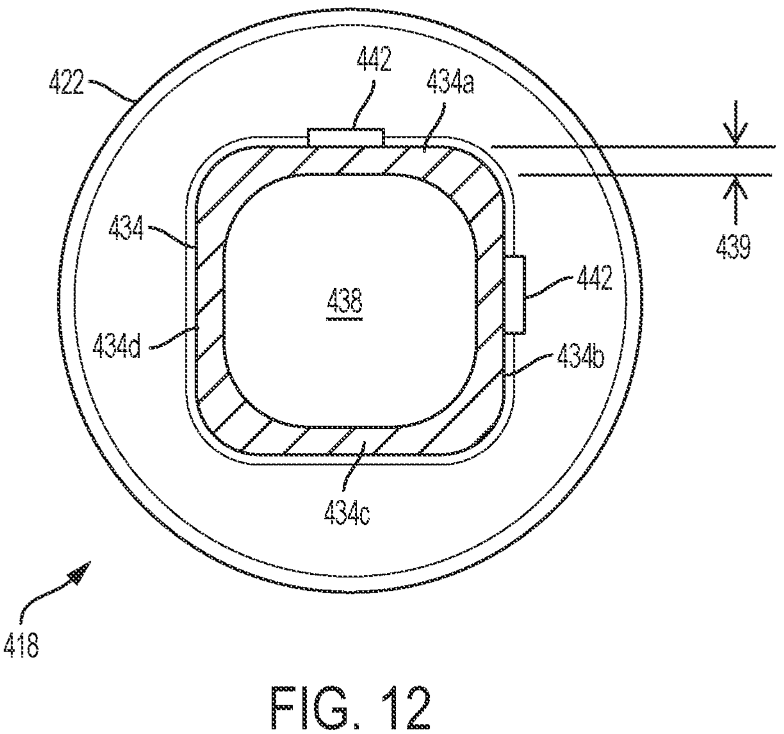
FIG. 12 is a cross-sectional view of the transducer assembly of FIG. 11 taken along line 12-12.

FIGS. 11 and 12 illustrate yet another transducer assembly 418 usable with the torque wrench 10 of FIG. 1. The transducer assembly 418 includes a frame 420 having two mounts 422, 430 and a beam 434 extending therebetween.

Unlike the beams in the previously described transducer assemblies, the beam 434 is hollow and has a substantially square cross-sectional shape (FIG. 12). As such, the beam 434 includes four walls **434*a-d* connected together at right angles, with each wall 434*a-d* having a wall thickness 439 of about one millimeter to about three millimeters. More specifically, the wall thickness 439 of each wall 434*a-d* is about two millimeters. The transducer assembly 418 also includes a strain gauge 442 on each of the walls 434*a*, 434*b* on an exterior surface thereof for detecting the strain on the beams 434. In other embodiments, each of the walls 434*a-d* may include an associated strain gauge 442. Because the beam 434 is hollow, an air gap 438 exists through which the crankshaft 46** extends.

Figure 13:
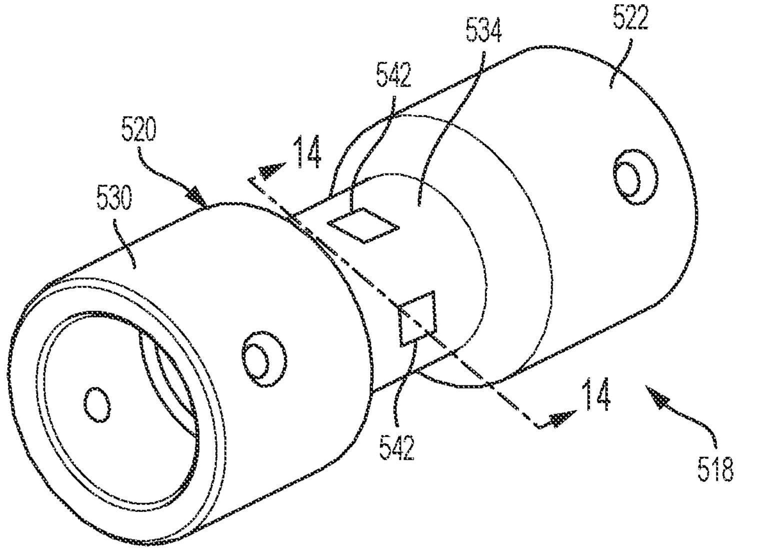
FIG. 13 is a perspective view a transducer assembly used in a powered ratcheting torque wrench in accordance with yet another embodiment of the invention.
Figure 14:
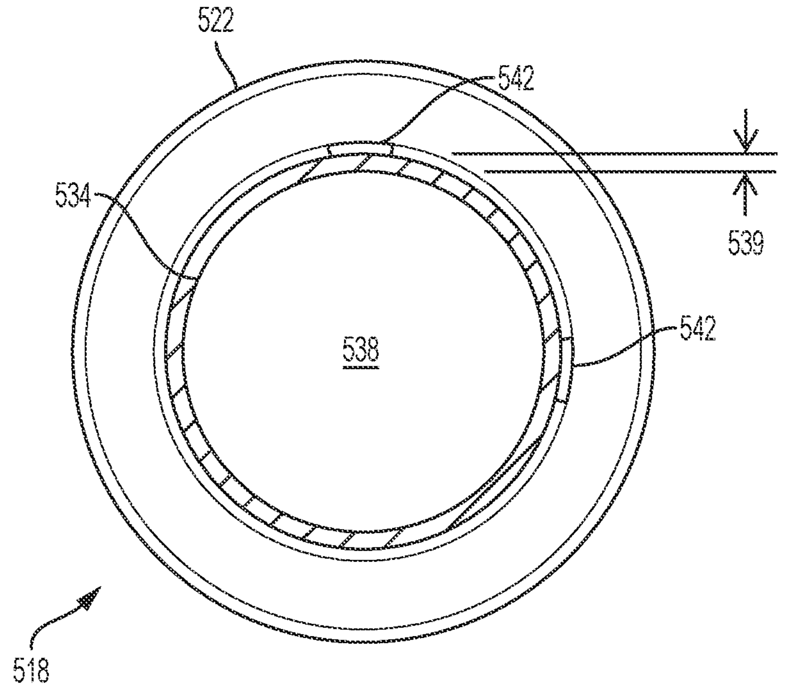
FIG. 14 is a cross-sectional view of the transducer assembly of FIG. 13 taken along line 14-14.

FIGS. 13 and 14 illustrate yet another transducer assembly 518 usable with the torque wrench 10 of FIG. 1. The transducer assembly 518 includes a frame 520 having two mounts 522, 530 and a beam 534 extending therebetween. Similar to the beam 434, the beam 534 is hollow but has a substantially tubular cross-section (FIG. 14) rather than a square cross-section. The beam 534 has a wall thickness 539 of about 0.5 millimeters to about 1.5 millimeters. More specifically, the wall thickness 539 is about one millimeter. The transducer assembly 518 also includes two strain gauges 542 disposed on the exterior surface of the beam 534 and spaced apart 90 degrees from each other. In other embodiments, the beam 534 may include more than two strain gauges 542 that are spaced apart at various angular intervals. Because the beam 534 is hollow, an air gap 538 exists through which the crankshaft 46 extends.

With reference to FIGS. 2 and 5, the multi-piece crankshaft 46 includes a first shaft 157 having the eccentric member 48 at a front end thereof and a second shaft 158 having a rear end coupled for co-rotation with the carrier 40. The first and second shafts 157, 158 are coupled for co-rotation via a universal joint (i.e., U-joint 162). Alternatively, a swivel spline or a flexible shaft, or another coupling that permits misalignment between the shafts 157, 158 while also transmitting torque from the shaft 157 to the shaft 158, may be used instead of the U-joint 162. Furthermore, the shafts 157, 158 may be integrally formed as a single flexible shaft. The U-joint 162 is disposed within the air gap 138 between the two beams 134 of the transducer assembly 118 to permit misalignment between the shafts 157, 158 along the axis A when the beams 134 experience bending. Particularly, the U-joint 162 includes a socket 166 and a pin 170 that is received within the socket 166 such that the pin 170 is allowed to pivot within the socket 166. As a result, the U-joint 162 permits the first shaft 157 to rotate about a longitudinal axis that is non-collinear with the axis A of the motor drive shaft 20.

Figure 19:
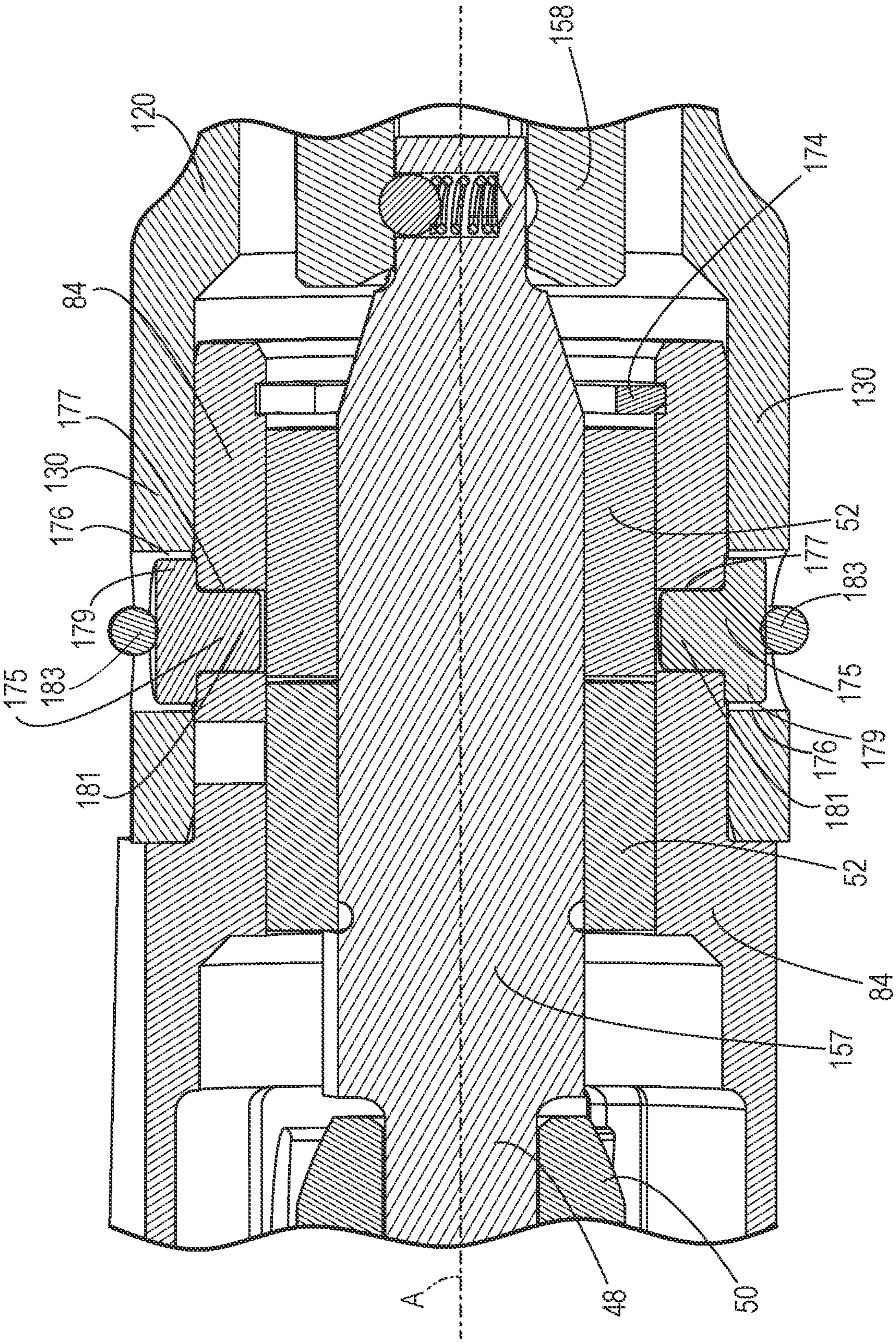
FIG. 19 is a cross-sectional view of a powered ratcheting torque wrench in accordance with another embodiment of the invention.

In the embodiment illustrated in FIG. 19, there are two needle bearings 52 that support the first shaft 157 within the cylindrical portion 84 of head 14. A retainer, such as a first retaining ring 174 is set within the cylindrical portion 84 and arranged between the needle bearings 52 and the second shaft 158. Thus, during operation of the wrench 10, the needle bearings 52 are inhibited from translating axially along axis A past the retaining ring 174. Instead, the needle bearing 52 closest to retaining ring 174 would abut against the retaining ring 174. In this manner, the needle bearings 52 are prevented from translating into a position in which they might otherwise fracture or break. In some embodiments, there are one or more needle bearings 52 supporting the second shaft 158 within the frame 120 or gear housing 36, and a retaining ring to prevent axial translation of the needle bearings 52 along axis A and second shaft 158 within the frame 120 or gear housing 36.

As also shown in FIG. 19, a pair of pins 175 are used to couple the second mount 130 of the frame 120 to the cylindrical portion 84 of the head 14 to prevent axial displacement of the head 14 with respect to the frame 120. In the embodiment illustrated in FIG. 19, the pins 175 extend through frame bores 176 of the second mount 130 and head bores 177 of the cylindrical portion 84. The pins 175 each have a head portion 179 that has a greater diameter than a shank portion 181 of the pin 175. Likewise, the frame bores 176 each have greater diameters than the diameters of the head bores 177, such that the frame bores 176 respectively accommodate the head portions 179 and the head bores 177 respectively accommodate the shank portions 181 of the pins 175. In the embodiment illustrated in FIG. 19, the pins 175 are retained in the frame and head bores 176, 177 by a second retaining ring 183 that extends around the circumference of the second mount 130 and over the frame bores 176 to prevent the pins 175 from moving away from the axis A and out of the frame and head bores 176, 177, thereby securing the cylindrical portion 84 of the head 14 to the frame 120. In the embodiment illustrated in FIG. 19, the pins 175 extend in a direction perpendicular to the axis A. In some embodiments, the pins 175 are slip fit through frame bores 176 and head bores 177.

Figure 8:
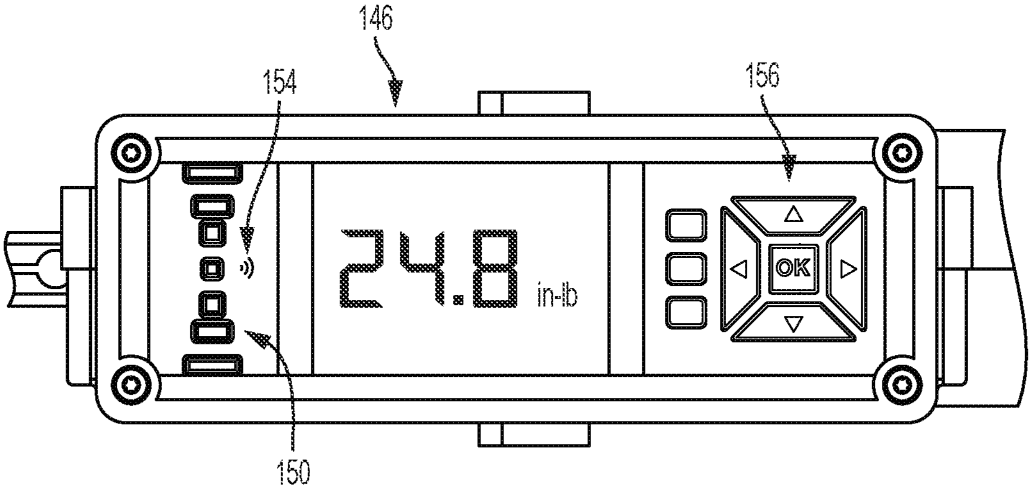
FIG. 8 is a plan view of a display device of the powered ratcheting torque wrench of FIG. 1.

With reference to FIG. 8, the wrench 10 also includes a display device 146 with which the transducer assembly 118 interfaces (i.e., through the high-level or master controller) to display the numerical torque value output by the output member 102 when the wrench 10 is manually rotated about axis B with the motor 18 deactivated. Such a display device 146 (e.g., a display screen) may be situated on the housing 12 and/or the gear housing 18, or may be remotely positioned from the wrench 10 (e.g., a mobile electronic device). In an embodiment of the wrench 10 configured to interface with a remote display device, the wrench 10 would include a transmitter (e.g., using Bluetooth or WiFi transmission protocols, for example) for wirelessly communicating the torque value achieved by the output member 102 to the remote display device. With reference to FIG. 8, the on-board display device 146 indicates the numerical torque value measured by the transducer assembly 118. The wrench 10 also includes a visual indicator, such as an LED 150, and an audible indicator, such as a buzzer 154, that may work in conjunction with or separately from the LED 124 to indicate to a user when a pre-defined torque setting is reached. A user may also adjust the pre-defined torque settings using buttons 156 provided adjacent the display device 146.

Figure 20:
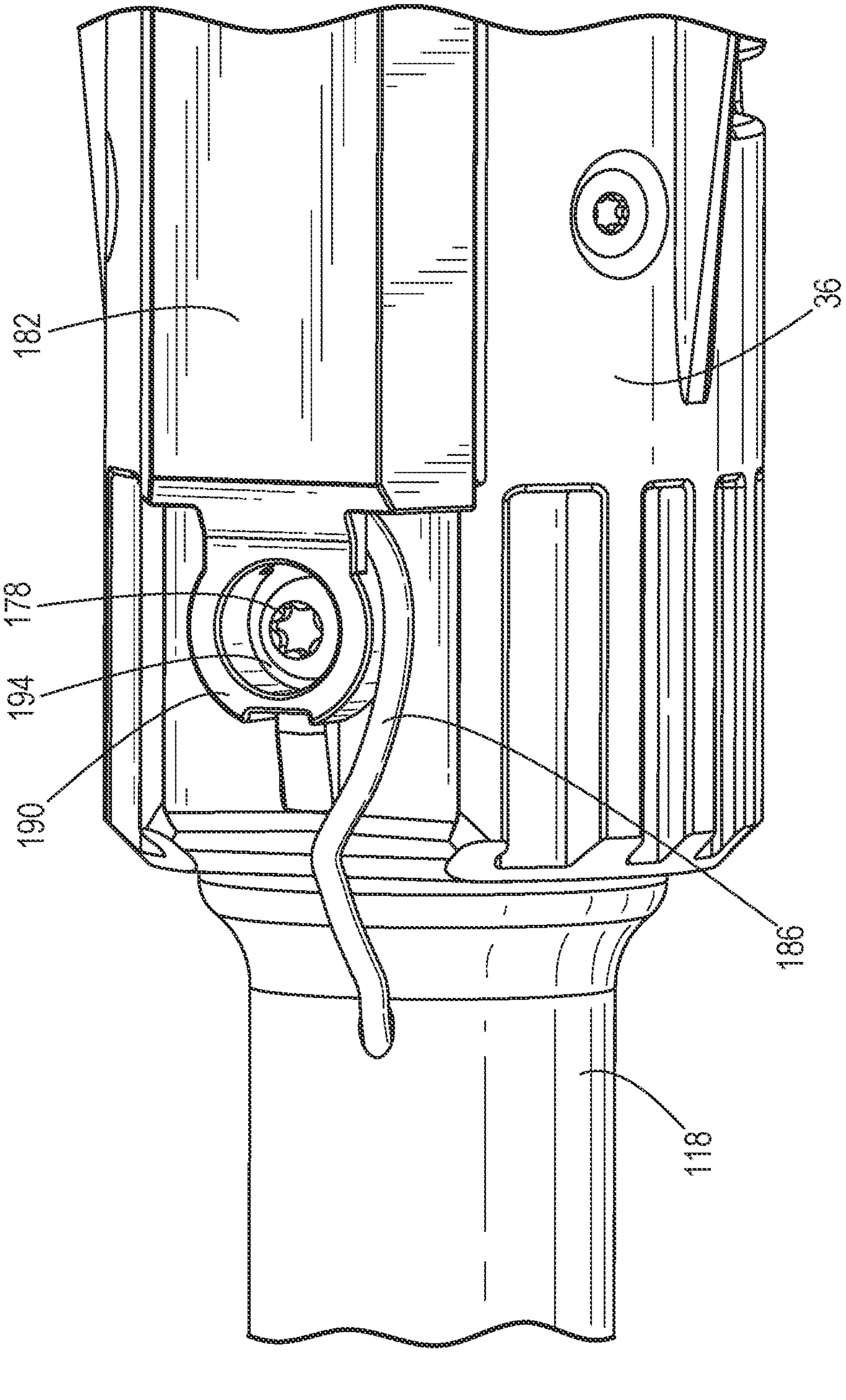
FIG. 20 is a perspective view of a powered ratcheting torque wrench with portions removed, in accordance with another embodiment of the invention.

In the embodiment illustrated in FIG. 20, a fastener, such as a screw 178, secures the gear housing 36 to the transducer assembly 118. A cover 182 is arranged on the gear housing 36 to partially cover a wire 186 that electrically connects the onboard display device 146 to the transducer assembly 118. The wire 186 extends from the cover 182, along the gear housing 36, to the transducer assembly 118. The cover 182 includes a barrier 190 to separate the wire 186 from the screw 178. In the embodiment illustrated in FIG. 20, the barrier 190 is annular and includes a recess 194 to allow insertion of screw 178 through the barrier 190. The recess 194 acts as a counter-bore hole for the head of the screw 178, such that the head of the screw 178 is arranged in the recess 194 and does not extend above the barrier 190. The barrier 190 prevents the wire 186 from contacting the screw 178, thus preventing the screw 178 from lacerating, chafing, or otherwise damaging the insulation jacket of the wire 186. In other embodiments, a screw is not used to couple the gear housing 36 to the transducer assembly 118. Rather, the gear housing 36 may be snap fit to the transducer assembly 118.

In operation of the wrench 10, the user first sets a pre-defined torque value or setting using the buttons 156 and the feedback provided by the display device 146. Subsequently, the user actuates the paddle 28, which activates the motor 18 to provide rapid bursts of torque to the output member 102, causing it to rotate, as the yoke 54 pivotably reciprocates about the axis A. In this manner, a fastener (e.g., a bolt or nut) can be quickly driven by the output member 102 to a seated position on a workpiece. After the fastener is seated on the workpiece, the user may release the paddle 28, thereby deactivating the motor 18. Alternatively, the control system of the wrench 10 may be configured to deactivate the motor 18 upon the fastener becoming seated on the workpiece without requiring the user to release the paddle 28. In either case, when the motor 18 is deactivated, the transducer assembly 118 may remain active to measure the torque imparted on the output member 102 and the fastener in response to the wrench 10 being manually rotated about the axis B by the user. At this time, the output member 102 becomes effectively rotationally locked to the head 14 (and therefore the housing 12) when the anvil 56 and connected pawl 58 back-drive the yoke 58 which, in turn, is unable to further back-drive the eccentric member 48 on the crankshaft 46.

As the user applies a rotational force or moment on the wrench about axis B (with the motor deactivated), the beams 134 of the transducer assembly 118 undergo bending and therefore experience strain. The controller of the wrench 10, which may be implemented as an electronic processor 1025 (FIG. 15), monitors the signals output by the strain gauges 126, interpolates the signals to a torque value, compares the measured torque to one or more pre-defined values or settings input by the user, and activates the LED 150 (and/or the LED 124 to vary a lighting pattern of the workpiece) to signal the user of the wrench 10 that a final desired torque value has been applied to a fastener. The wrench 10 may also activate the buzzer 154 when the final desired torque value has been applied to a fastener to provide an audible signal to the user.

Figure 15:
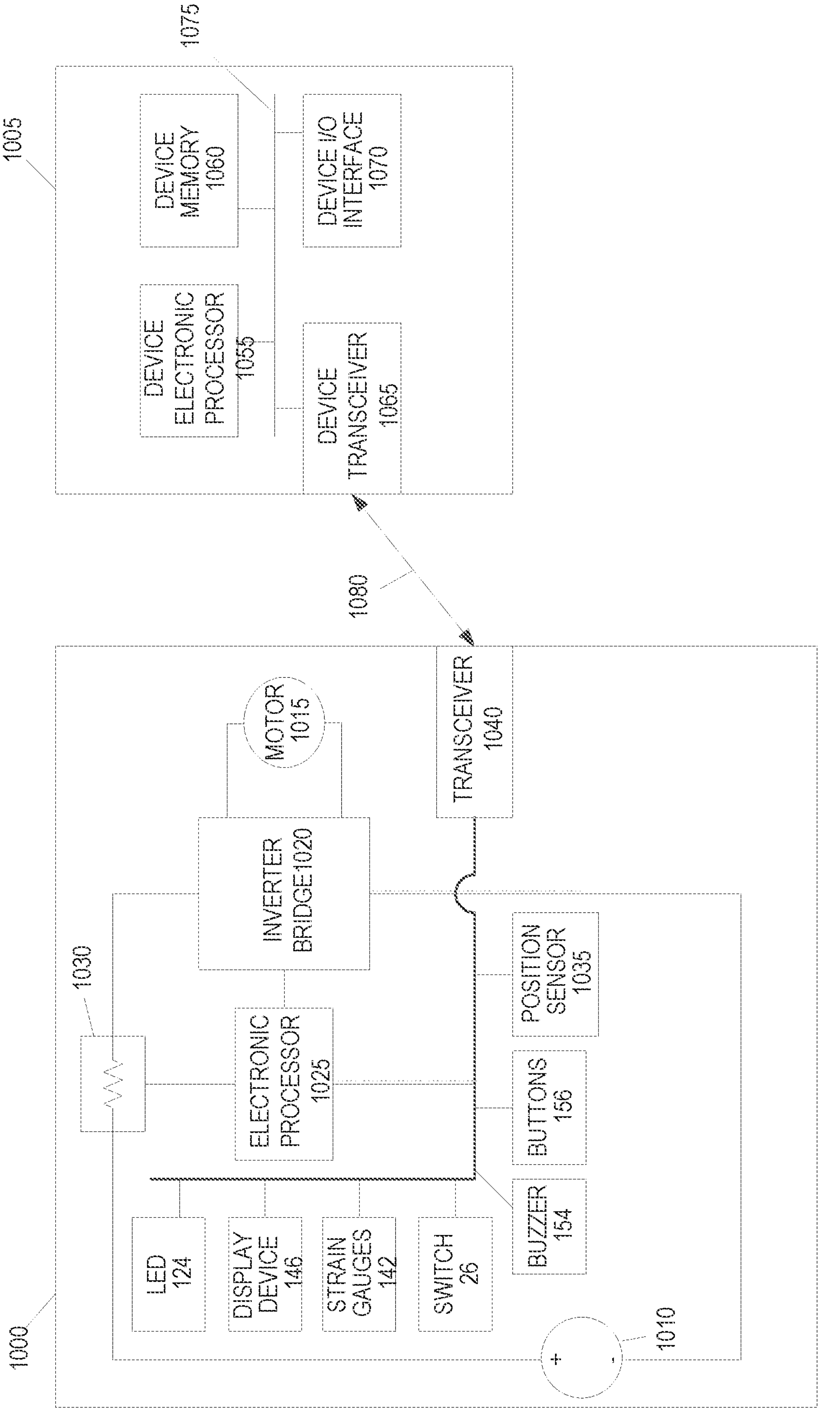
FIG. 15 is a block diagram of a power tool, such as the powered ratcheting torque wrench of FIG. 1, communicating with a remote device in accordance with an embodiment of the invention.

FIG. 15 is a block diagram of one embodiment of a power tool 1000 communicating with a remote device 1005. In some embodiments, the power tool 1000 is the ratcheting torque-wrench 10 described above. In other embodiments, the power tool 1000 may be a different power tool such as a screwdriver/nutrunner, a hammer drill, or the like. The remote device 1005 is, for example, a smart telephone, a laptop computer, a tablet computer, a desktop computer, or the like.

The power tool 1000 includes a power supply 1010, a motor 1015, an inverter bridge 1020, an electronic processor 1025, a torque sensor 1030, a position sensor 1035, and a transceiver 1040. In some embodiments, the power tool 1000 further includes the above-mentioned LED 124, strain gauges 142, display device 146, buzzer 154, and buttons 156, which are electrically connected to the electronic processor 1025 and operate as discussed above. The remote device 1005 includes a device electronic processor 1055, a device memory 1060, a device transceiver 1065, and a device input/output interface 1070. The device electronic processor 1055, the device memory 1060, the device transceiver 1065, and the device input/output interface 1070 communicate over one or more control and/or data buses (for example, a communication bus 1075). FIG. 15 illustrates only one example embodiment of a power tool 1000 and a remote device 1005. The power tool 1000 and/or the remote device 1005 may include more of fewer components and may perform functions other than those explicitly described herein.

As described above, the power supply 1010 may be a battery pack (e.g., battery pack 16), an AC utility source, or the like. The motor 1015 is, for example, an electric brushless DC motor (such as, the electric motor 18) controlled by the electronic processor 1025 through the inverter bridge 1020.

In some embodiments, the electronic processor 1025 is implemented as a microprocessor with separate memory. In other embodiments, the electronic processor 1025 may be implemented as a microcontroller (with memory on the same chip). In other embodiments, the electronic processor 1025 may be implemented using multiple processors. In addition, the electronic processor 1025 may be implemented partially or entirely as, for example, a field-programmable gate array (FPGA), an applications specific integrated circuit (ASIC), and the like and a memory may not be needed or may be modified accordingly. The device electronic processor 1055 may be implemented in various ways including ways that are similar to those described above with respect to electronic processor 1025. In the example illustrated, the device memory 1060 includes non-transitory, computer-readable memory that stores instructions that are received and executed by the device electronic processor 1055 to carry out the functionality of the remote device 1005 described herein. The device memory 1060 may include, for example a program storage area and a data storage area. The program storage area and the data storage area may include combinations of different types of memory, such as read-only memory and random-access memory.

The transceiver 1040 enables wired or wireless communication between the power tool 1000 and the remote device 1005. In some embodiments, the transceiver 1040 is a transceiver unit including separate transmitting and receiving components, for example, a transmitter and a receiver. The device transceiver 1065 enables wired or wireless communication between the remote device 1005 and the power tool 1000. In some embodiments, the device transceiver 1065 is a transceiver unit including separate transmitting and receiving components, for example, a transmitter and a receiver.

The device input/output interface 1070 may include one or more input mechanisms (for example, a touch pad, a keypad, a button, a knob, and the like), one or more output mechanisms (for example, a display, a speaker, and the like), or a combination thereof, or a combined input and output mechanism such as a touch screen.

The torque sensor 1030 is used to measure an output torque of the power tool 1000. In the example illustrated, the torque sensor 1030 is a current sense resistor (e.g., a current sensor) connected in a current path of the power tool 1000. The torque sensor 1030 therefore measures a motor current (which is directly proportional to the output torque) flowing to the motor 1015 and provides an indication of the motor current to the electronic processor 1025. As illustrated, the power tool 1000 includes both the torque sensor 1030 providing a current-based torque measurement, and the strain gauges 142 providing a strain-based torque measurement. However, in some embodiments, one, but not both, of the torque sensor 1030 and the strain gauges 142 are provided in the power tool 1000 to provide torque measurement data to the electronic processor 1025. As a further alternative, the power tool 1000 may include a transducer assembly such as that disclosed in U.S. Patent Application Publication No. 2016/0318165 published Nov. 3, 2016, the entire content of which is incorporated herein by reference, to directly measure the torque output by the power tool 1000 at its output shaft.

The position sensor 1035 is used to measure an absolute or relative position of the power tool 1000. In one example, the position sensor 1035 is an inertial measurement unit including one or more of an accelerometer, a gyroscope, a magnetometer, and the like. The position sensor 1035 may determine a position of the power tool 1000 based on a dead reckoning technique. That is, the position sensor 1035 may calculate a position of the power tool 1000 by using a previously determined position, and advancing that position based upon readings from the accelerometer, the gyroscope, the magnetometer, etc.

Figure 16:
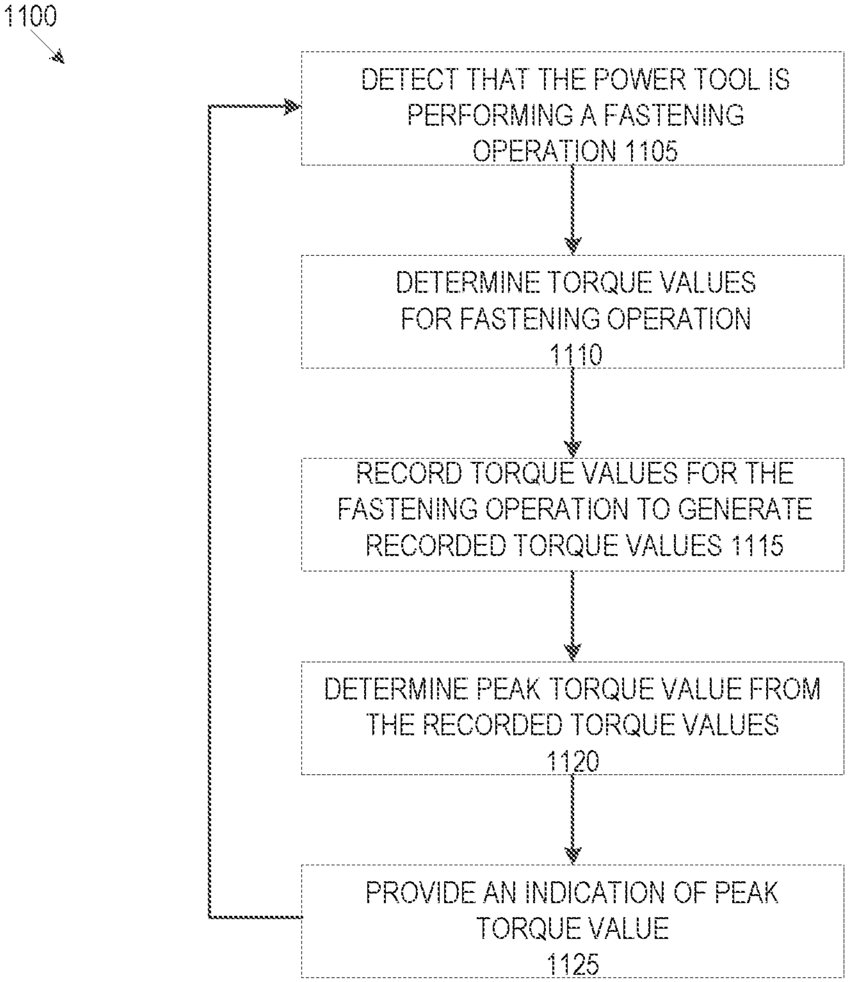
FIG. 16 is a flowchart of a method of determining peak torque for fastening operations of the power tool of FIG. 15 in accordance with an embodiment of the invention.

FIG. 16 is a flowchart illustrating one example method 1100 of determining peak torque for fastening operations of the power tool 1000. As illustrated in FIG. 16, the method 1100 includes detecting that the power tool 1000 is performing a fastening operation for a first fastener (at block 1105). The electronic processor 1025 may determine that the power tool 1000 is performing a fastening operation for a first fastener based on signals from the motor activation switch 26, the position sensor 1035, and/or the torque sensor 1030. For example, the electronic processor 1025 may determine that a fastening operation has begun when the electronic processor 1025 receives an activation signal from the motor activation switch 26 in response to depression of the paddle 28 or when the electronic processor 1025 receives a positive torque signal (for example, over an activation threshold) from the torque sensor 1030.

The electronic processor 1025 may determine that the fastening operation is for the first fastener based on the position of the power tool 1000 as indicated by the position sensor 1035. In some embodiments, the electronic processor 1025 may assign a first position signal received from the position sensor 1035 to the first fastener and store the first position corresponding to the first fastener. That is, the electronic processor 1025 determines, based on an output from the position sensor 1035, that the power tool 1000 is at a first location. The electronic processor 1025 provides an indication that the power tool 1000 is at a first location in response to determining that the power tool 1000 is at the first location. For example, the electronic processor 1025 may provide the indication to the remote device 1005, which displays that the power tool 1000 is fastening a first fastener. Similarly, when the power tool 1000 is moved to a second position, for example, to fasten a second fastener, the electronic processor 1025 determines that the power tool 1000 is at a second location and, in response, provides an indication that the power tool 1000 is at the second location.

The method 1100 also includes determining, using the torque sensor 1030 of the power tool 1000, torque values for the fastening operation (at block 1110). The torque sensor 1030 detects the output torque of the power tool 1000 during the fastening operation. As described above, in some embodiments, the torque sensor 1030 is a current sensor and provides an indication of a motor current to the electronic processor 1025. The electronic processor 1025 determines the torque output of the power tool 1000 based on the motor current reading.

The method 1100 further includes recording, using the electronic processor 1025 of the power tool 1000, the torque values for the fastening operation to generate recorded torque values for the fastening operation (at block 1115). The electronic processor 1025 may receive torque values from the torque sensor 1030, for example, every 1 millisecond. The electronic processor 1025 may record or store the torque values for the fastening operation corresponding to the first fastener. In some embodiments, as further described below, the torque values may only be recorded when the fastener starts moving (i.e., upon overcoming the static friction). The electronic processor 1025 determines that the first fastener has started moving due to the fasting operation based on, for example, signals from the hall-sensor of the motor 1015. The recording of the torque values is started after the determination that the first fastener has started moving. In some embodiments, the torque values are recorded along with an indication of the identity of the fastener determined in block 1105 (e.g., first fastener, second fastener, etc.), of the location of the fastener determined in block 1105 (e.g., first location, second location, etc.), or both. In some embodiments, the data recorded in block 1115 is stored in a memory of the power tool 1000, in the device memory 1060 of the remote device 1005 (after transmission from the transceiver 1040 to the device transceiver 1065), or both.

The method 1100 also includes determining a peak torque value from the recorded torque values, wherein the peak torque value corresponds to the fastening operation (at block 1120). The electronic processor 1025 determines the peak torque value corresponding to the fastening operation from the recorded torque values for the fastening operation. That is, the electronic processor 1025 may determine that the highest recorded torque value as the peak torque value for the fastening operation. The electronic processor 1025 provides the peak torque value to the remote device 1005.

In some embodiments, in addition to or instead of the electronic processor 1025, the device electronic processor 1055 may determine the peak torque value for the fastening operation from the recorded torque values. For example, the electronic processor 1025 may provide the torque values for the fastening operation to the remote device 1005 (e.g., as part of block 1115). The remote device 1005 may store, in the device memory 1060 or another coupled memory, the torque values received for the fastening operation of the first fastener corresponding to the first fastener. The torque values may be stored with the identity of the fastener, the fastener location, or both to correlate the torque values to the fastening operation of the first fastener. The device electronic processor 1055 may then determine the peak torque value for the fastening operation from the recorded torque values.

At block 1125, the method 1100 further includes providing an indication of the peak torque value that was determined in block 1120. For example, the electronic processor that performed the determination at block 1120, whether the electronic processor 1025 or the device electronic processor 1055, outputs the peak torque value at block 1125. Providing the indication of the peak torque value may include, for example, displaying the peak value (e.g., on the display device 146 or a display of the device I/O interface 1070) to inform the user of the peak torque applied to the fastener during the fastener operation, stored in a memory of the power tool 1000, the device memory 1060, or another coupled memory (e.g., coupled to the remote device 1005 via a network), or transmission of the peak torque value to another device. Transmission of the peak value may include transmission of the peak torque value from the power tool 1000 via the transceiver 1040 to the device transceiver 1065 of the remote device 1005, or may include the remote device 1005 transmitting the peak torque value to another device (e.g., coupled to the remote device 1005 via a network).

In some embodiments, after providing the indication of the peak torque value at block 1125, the method 1100 returns to block 1105 to detect another fastening operation.

In some embodiments, the method 1100 may further include determining that the fastening operation is completed when the peak torque value exceeds a predetermined torque threshold. The peak torque value is compared to the predetermined torque threshold to determine whether the peak torque value exceeds the predetermined threshold. When the peak torque value exceeds the predetermined torque threshold, the electronic processor 1025 determines that the fastening operation is complete.

The method 1100 may also include providing an indication that the fastening operation is completed in response to determining completion of the fastening operation. The electronic processor 1025 may provide audio (e.g., buzz or beep), visual (e.g., lighting an LED), or a haptic (e.g., vibration feedback) signal to the user through the power tool 1000 to indicate that the fastening operation was properly completed. In some embodiments, the electronic processor 1025 stops an operation of the motor 1015 in response to the indication that the fastening operation is completed.

In some embodiments, the electronic processor 1025 may stop recording the torque values for the fastening operation when the power tool 1000 is moved to a new (e.g., second) location. The electronic processor 1025 determines, using the position sensor 1035, that the power tool 1000 is moved to a second location. The electronic processor 1025 stops recording torque values (for example, at block 1115) in response to determining that the power tool 1000 is moved to the second location. In addition, the electronic processor 1025 may provide the position information, the recorded torque values, and/or the peak torque information of the fastening operation to the remote device 1005 in response to determining that the power tool 1000 is moved to the second location.

Figure 17:
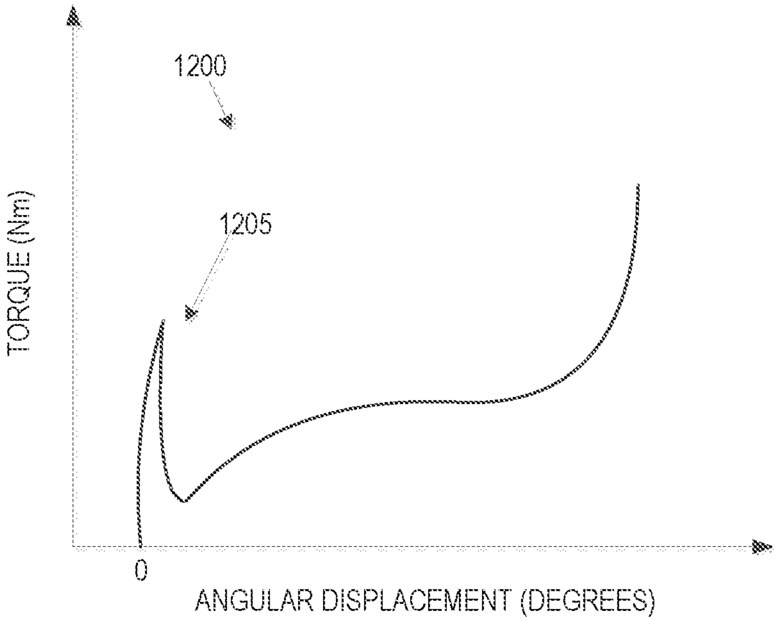
FIG. 17 illustrates an example torque-angle curve for the power tool of FIG. 15.

In addition to recording torque values for the fastening operation, the electronic processor 1025 also detects and records angular displacement of the fastener. The electronic processor 1025 may measure the angular displacement based on signals received from a Hall-effect sensor unit of the motor 1015. The electronic processor 1025 generates a torque-angle curve based on the recorded torque values and the recorded angular displacement of the fastener. The torque-angle curve illustrates a mapping between the angular displacement of the fastener and the torque output of the power tool 1000. FIG. 17 illustrates an example torque-angle curve 1200 for the power tool 1000. The torque-angle curve 1200 is useful in determining characteristics of the fastening operation or the fastener as described in detail below.

As can be seen in FIG. 17, the torque-angle curve includes an initial torque spike 1205. In order to begin movement of the fastener, the power tool 100 first needs to overcome static friction, which, at least in part, causes the initial torque spike 1205. Once the fastener begins moving, the torque output of the power tool 100 drops and slowly rises as the fastener is tightened. The torque-spike 1205 may mislead analysis of the torque-angle curve to determine characteristics of the fastening operation (e.g., the peak torque) or the fastener. Therefore, it may be helpful to remove the initial torque spike 1205 from the torque-angle curve 1200.

Figure 18:
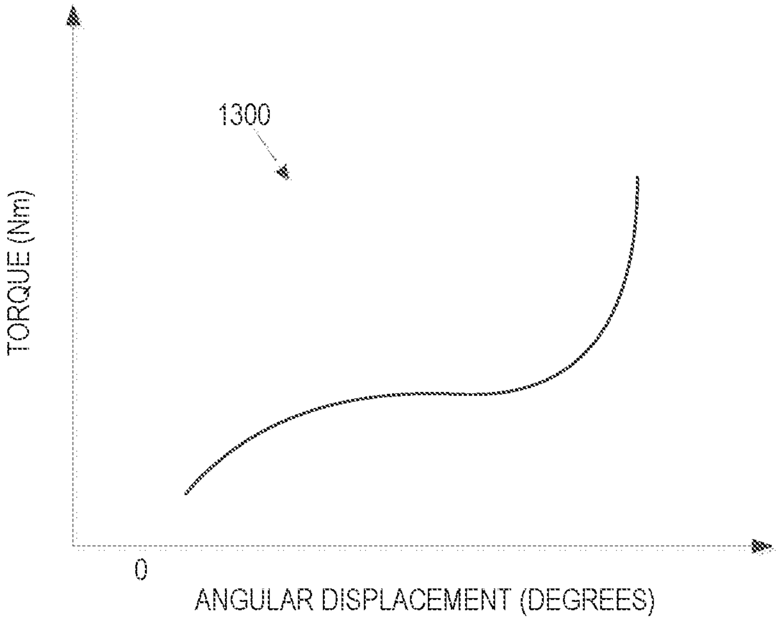
FIG. 18 illustrates an example torque-angle curve for the power tool of FIG. 15 having an initial torque spike removed.

FIG. 18 illustrates a torque-angle curve 1300 with the torque spike 1205 removed. In one example, the electronic processor 1025 may remove the torque angle spike based on the angular displacement of the fastener. That is, the electronic processor 1025 may only start recording the torque values when the angular displacement is detected. In another example, the electronic processor 1025 may remove the torque spike 1205 based on a slope analysis of the torque-angle curve 1200. That is, the electronic processor 1025 may continuously determine a slope of the torque-angle curve 1200 and remove the portion prior to detecting an abrupt change in slope. Several other techniques are available and can be contemplated by a person of ordinary skill in the art to remove the initial torque spike 1205.

The torque-angle curve 1300 may be used to determine an attribute of the fastener (e.g., the first fastener). For example, the electronic processor 1025 may determine a type of fastener based on the torque-angle curve. Each type (or kind) of fastener (e.g., a nut, a bolt, a screw, and different diameters, lengths, shapes and materials of each) has a particular torque-angle signature. During manufacturing and testing, torque-angle curves of different types of fastener can be determined by the power tool 1000 manufacturer. These torque-angle signatures may be stored in a look-up table correlating the type of fastener to its torque-angle signature. During operation, determining the type of fastener is determined by comparing the torque-angle curve to the look-up table stored in a memory of the power tool 1000 or in the device memory 1060.

As an example, the above-described features are useful when the power tool 1000 is used to tighten a plurality of fasteners, for example, in an assembly line or other ordered assembly process. The power tool 1000 provides torque values, a torque-angle curve, a peak torque value, and/or position information for each fastening operation to the remote device 1005. The remote device 1005 may use the position information to determine which fastener is being tightened. For example, when the remote device 1005 receives a position signal indicating that the power tool 1000 is at a first position and further receives torque values along with or immediately after the position signal, the remote device 1005 determines that power tool 1000 is fastening a first fastener based on the position signal indicating that the power tool is at a first position and stores the torque values as corresponding to the fastening operation of the first fastener. Similarly, when the remote device 1005 receives a position signal indicating that the power tool 1000 is at a second position, and further receives torque values along with or immediately after the position signal, the remote device 1005 determines that the fastening operation of the first fastener is completed, that the power tool 1000 is fastening a second fastener, and stores the torque values as corresponding to the fastening operation of a second fastener. The remote device 1005 uses the peak torque value and the torque-angle curve for each fastener and determines the type of fastener and whether the fastener was properly tightened. The remote device 1005 may display an indication on the device input/output interface 1070 indicating the type of fastener and whether the fastener was properly tightened. Based on this displayed information, the user may return to a particular fastener to re-tighten the fastener when the remote device 1005 indicates that the particular fastener was not properly tightened.

Various features of the invention are set forth in the following claims.

What is claimed is:

1. A power tool comprising:

a housing defining a grip portion;

a motor having a motor drive shaft that is centered about a drive axis;

a drive assembly including a crankshaft configured to receive torque from the motor drive shaft;

an output assembly having an output member configured to receive torque from the crankshaft, causing the output member to rotate about an output axis;

a bearing rotatably supporting the crankshaft;

a retaining ring configured to prevent translation of the bearing along the crankshaft past the retaining ring;

a transducer assembly disposed between the grip portion and the output member to measure the amount of torque applied through the output member; and a head in which the output member is at least partly received, wherein the crankshaft extends from the transducer assembly and through a cylindrical bore of the head, wherein the retaining ring is disposed within a circumferential groove within the cylindrical bore, and wherein the bearing is positioned within the cylindrical bore in the head and spaced away from the circumferential groove in a direction along the drive axis.

2. The power tool of claim 1, wherein the bearing is a needle bearing.

3. The power tool of claim 1, wherein the bearing is a first bearing, and the power tool further comprises a second bearing rotatably supporting the crankshaft, and wherein the first bearing is arranged between the second bearing and the retaining ring.

4. The power tool of claim 3, wherein the transducer assembly includes a frame interconnecting the housing and the head, and wherein the power tool further comprises a pin retaining the frame to the head and another retaining ring arranged around the frame and the pin.

5. The power tool of claim 1, wherein the crankshaft includes a first shaft coupled for rotation with a second shaft that is driven by the motor, and wherein the first shaft is at least partially arranged in the head and rotatably supported by the bearing and retaining ring, and wherein the second shaft is rotatably supported by a second bearing.

6. The power tool of claim 5, wherein the transducer assembly includes a frame interconnecting the housing and the head, and wherein the second shaft and the second bearing are at least partially arranged within the frame.

7. The power tool of claim 5, further comprising a gear case at least partially housing a gear train for transferring torque from the motor to the second shaft, and wherein the second shaft is at least partially arranged within the gear case, and wherein the second bearing is arranged within the gear case.

* * * * *